(12) United States Patent
Naara et al.

(10) Patent No.: US 11,622,020 B2
(45) Date of Patent: Apr. 4, 2023

(54) PUSH CONTROL

(71) Applicant: EntIT Software LLC, Sunnyvale, CA (US)

(72) Inventors: Hashem Naara, Yehud (IL); Michael Rodov, Yehud (IL); Amir David, Yehud (IL)

(73) Assignee: MICRO FOCUS LLC, Sanford, NC (US)

(*) Notice: Subject to any disclaimer, the term of this patent is extended or adjusted under 35 U.S.C. 154(b) by 597 days.

(21) Appl. No.: 15/693,067

(22) Filed: Aug. 31, 2017

(65) Prior Publication Data

US 2019/0068736 A1 Feb. 28, 2019

(51) Int. Cl.

| H04L 67/55 | (2022.01) |
|---|---|
| H04L 67/02 | (2022.01) |
| G06N 7/00 | (2023.01) |
| G06N 20/00 | (2019.01) |
| H04L 67/50 | (2022.01) |
| G06N 5/022 | (2023.01) |

(52) U.S. Cl.
CPC ............ *H04L 67/55* (2022.05); *G06N 7/005* (2013.01); *G06N 20/00* (2019.01); *H04L 67/02* (2013.01); *H04L 67/535* (2022.05); *G06N 5/022* (2013.01)

(58) Field of Classification Search
CPC ..... H04L 29/0881; H04L 67/02; H04L 67/10; H04L 67/22; H04L 67/26; H04L 67/2847; H04L 67/30; H04L 67/303; H04L 67/306; H04L 67/32; H04L 67/42; G06F 16/957; G06F 16/9574
See application file for complete search history.

(56) References Cited

U.S. PATENT DOCUMENTS

| 9,374,409 | B2 | 6/2016 | Gouache | |
|---|---|---|---|---|
| 10,225,365 | B1* | 3/2019 | Hotchkies | H04L 67/327 |
| 10,261,938 | B1* | 4/2019 | Jenkins | G06F 15/167 |
| 2008/0031190 | A1* | 2/2008 | Bae | H04L 5/023 |
| | | | | 370/329 |
| 2009/0112975 | A1* | 4/2009 | Beckman | H04L 67/26 |
| | | | | 709/203 |
| 2011/0270959 | A1* | 11/2011 | Schlusser | G06F 40/134 |
| | | | | 709/223 |

(Continued)

FOREIGN PATENT DOCUMENTS

WO    WO-2016046204 A1    3/2016

OTHER PUBLICATIONS

Li Fan, P. Cao, W. Lin and Q. Jacobson, "Web pre fetching between low-bandwidth clients and proxies: potential and performance." Sigmetrics, vol. 99, No. 5, 1999. (Year: 1999).*

(Continued)

*Primary Examiner* — Vivek Srivastava
*Assistant Examiner* — William C McBeth

(57) ABSTRACT

In some examples, push control may include generation of a learning-based decision model based on analysis of data associated with historical usage of an application. For a request for content associated with usage of the application, the learning-based decision model may be analyzed to determine a next request for additional content expected to occur after the request for content. Further, a push operation may be performed to push the additional content associated with the next request to a source of the request for content.

11 Claims, 11 Drawing Sheets

(56) References Cited

U.S. PATENT DOCUMENTS

| | | | | |
|---|---|---|---|---|
| 2014/0358994 | A1* | 12/2014 | Liu | H04L 67/26 709/203 |
| 2014/0362761 | A1* | 12/2014 | Dankberg | H04M 3/42178 370/312 |
| 2015/0244765 | A1 | 8/2015 | Bellessort | |
| 2015/0264115 | A1* | 9/2015 | Reilly | H04L 67/32 706/12 |
| 2016/0100332 | A1* | 4/2016 | Yi | H04L 67/26 370/338 |
| 2016/0198012 | A1 | 7/2016 | Fablet | |
| 2016/0226969 | A1* | 8/2016 | Holland | H04L 67/1076 |
| 2016/0248867 | A1* | 8/2016 | Alstad | H04L 67/26 |
| 2017/0006081 | A1 | 1/2017 | Grandl | |
| 2017/0111463 | A1 | 4/2017 | Maze | |
| 2017/0230442 | A1* | 8/2017 | Denoual | H04L 67/26 |
| 2017/0324807 | A1* | 11/2017 | Gu | H04L 67/02 |
| 2018/0081496 | A1* | 3/2018 | Bhardwaj | G06F 3/0481 |

OTHER PUBLICATIONS

P. Venketesh and R. Venkatesan, "Graph based prediction model to improve web prefetching," International Journal of Computer Applications, vol. 36, No. 10, Dec. 2011, pp. 37-43. (Year: 2011).*

S. K. Soni, R. Arora and A. S. Rodge, "'Referer' based Predictive Caching and session prefetching for Browser," 2014 Annual IEEE India Conference (INDICON), Dec. 2014, pp. 1-6. (Year: 2014).*

Kelton, Conor, et al. "Improving user perceived page load times using gaze." 14th USENIX Symposium on Networked Systems Design and Implementation ({NSDI} 17). 2017. (Year: 2017).*

N. D. R. Armstrong and P. A. S. Ward, "Just-In-Time Push Prefetching: Accelerating the Mobile Web," 2013 IEEE 27th International Conference on Advanced Information Networking and Applications (AINA), Barcelona, 2013, pp. 1064-1071 (Year: 2013).*

Georgakis, Apostolos, and Haibo Li. "User behavior modeling and content based speculative web page prefetching." Data & Knowledge Engineering 59.3 (2006): 770-788. (Year: 2006).*

Gündüz, Şule, and M. Tamer Özsu. "A web page prediction model based on click-stream tree representation of user behavior." Proceedings of the ninth ACM SIGKDD international conference on Knowledge discovery and data mining. 2003. (Year: 2003).*

Jeremy Wagner, "A Comprehensive Guide to HTTP/2 Server Push", Apr. 10, 2017, pp. 21. https://www.smashingmagazine.com/2017/04/guide-http2-sefver-push/.

M. Belshe, et al., "Hypertext Transfer Protocol Version 2 (HTTP/2)", May 2015, pp. 96. https://tools.ietf.org/html/rfc7540.

M. Belshe, et al., "Hypertext Transfer Protocol Version 2 (HTTP/2)", May 30, 2015, pp. 70. https://http2.github.io/http2-spec/.

Roy T. Fielding, "h2 priority", Aug. 31, 2014, pp. 3. https://www.ietf.org/maii-archive/web/httpbisa/current/msg22346.html.

Wikipedia, "HTTP/2 Server Push", pp. 3, download date Aug. 31, 2017. https://en.wikipedia.org/wiki/HTTP/2_Server_Push.

Xiao, M. et al., "Evaluating and Improving Push Based Video Streaming with Http/2", May 10-13, 2016, pp. 6. http://dl.acm.org/ft_gateway.cfm?id=2910652&ftid=1722527&dwn=1&CFID=940973767&CFTOKEN=59794551.

Zhong, G. et al., "A Geo-Adaptive JavaScript DASH Player", Dec. 2, 2014, pp. 2. http://dl.acm.org/ft_gateway.cfm?id=2683463&ftid=1516478&dwn=1&CFID=850031311&CFTOKEN=88784972.

* cited by examiner

```
500
  ↘ http.HandleFunc("/home", func(w http.ResponseWriter, r *http.Request) {
      // on requesting 'home' via r which points at an http.Request
502
  ↘ if pusher, ok := w.(http.Pusher); ok {
      // check if Push is supported (ok = true).
      // customize push options
504
  ↘ options := &http.PushOptions{
          Header: http.Header{
              "Accept-Encoding": r.Header["Accept-Encoding"],
          },
      }
      // Push
506
  ↘ predictedNextBP := PredictiveAnalytics.DecisionsModel.GetNext(r)
508
  ↘ if (predictedNextBP != nil) {
510
    ↘ if err := pusher.Push(predictedNextBP, options); err != nil {
512
      ↘ log.Printf("Failed: %v", err)
          }
      }
  }
  // ...
})
```

FIG. 5

| PUSH: ImgFile1 | PUSH: req1&2 | PUSH: req3 | PUSH:ImgFile2 |
| | PUSH: req1&2 | | |

700

1000

ASCERTAIN A REQUEST FOR CONTENT ASSOCIATED WITH USAGE OF
AN APPLICATION
1002

DETERMINE, BASED ON ANALYSIS OF A LEARNING-BASED DECISION
MODEL THAT IS GENERATED BASED ON ANALYSIS OF DATA
ASSOCIATED WITH HISTORICAL USAGE OF THE APPLICATION, A NEXT
REQUEST FOR ADDITIONAL CONTENT EXPECTED TO OCCUR AFTER
THE REQUEST FOR CONTENT, AND A FURTHER REQUEST FOR
FURTHER CONTENT EXPECTED TO OCCUR AFTER THE NEXT
REQUEST
1004

PACK A STREAM TO BE PUSHED TO A SOURCE OF THE REQUEST FOR
CONTENT WITH THE ADDITIONAL CONTENT ASSOCIATED WITH THE
NEXT REQUEST AND THE FURTHER CONTENT ASSOCIATED WITH THE
FURTHER REQUEST
1006

PERFORM A PUSH OPERATION TO PUSH THE PACKED STREAM
INCLUDING THE ADDITIONAL CONTENT ASSOCIATED WITH THE NEXT
REQUEST AND THE FURTHER CONTENT ASSOCIATED WITH THE
FURTHER REQUEST TO THE SOURCE
1008

FIG. 10

PUSH CONTROL

BACKGROUND

With respect to exchange of resources between a web server and a web browser, Hypertext Transfer Protocol version 2 (HTTP/2) Push allows a web server to send resources to a web browser. In this regard, the resources may be pushed to the web browser before the web browser requests the resources. The pushed resources may be used by the web browser when the web browser may have generated a request to get the resources.

BRIEF DESCRIPTION OF DRAWINGS

Features of the present disclosure are illustrated by way of example and not limited in the following figure(s), in which like numerals indicate like elements, in which:

FIG. 5 illustrates code with respect to the push control apparatus of FIG. 1;

FIG. 10 illustrates an example flowchart of a method for push control; and

DETAILED DESCRIPTION

Figure 1:
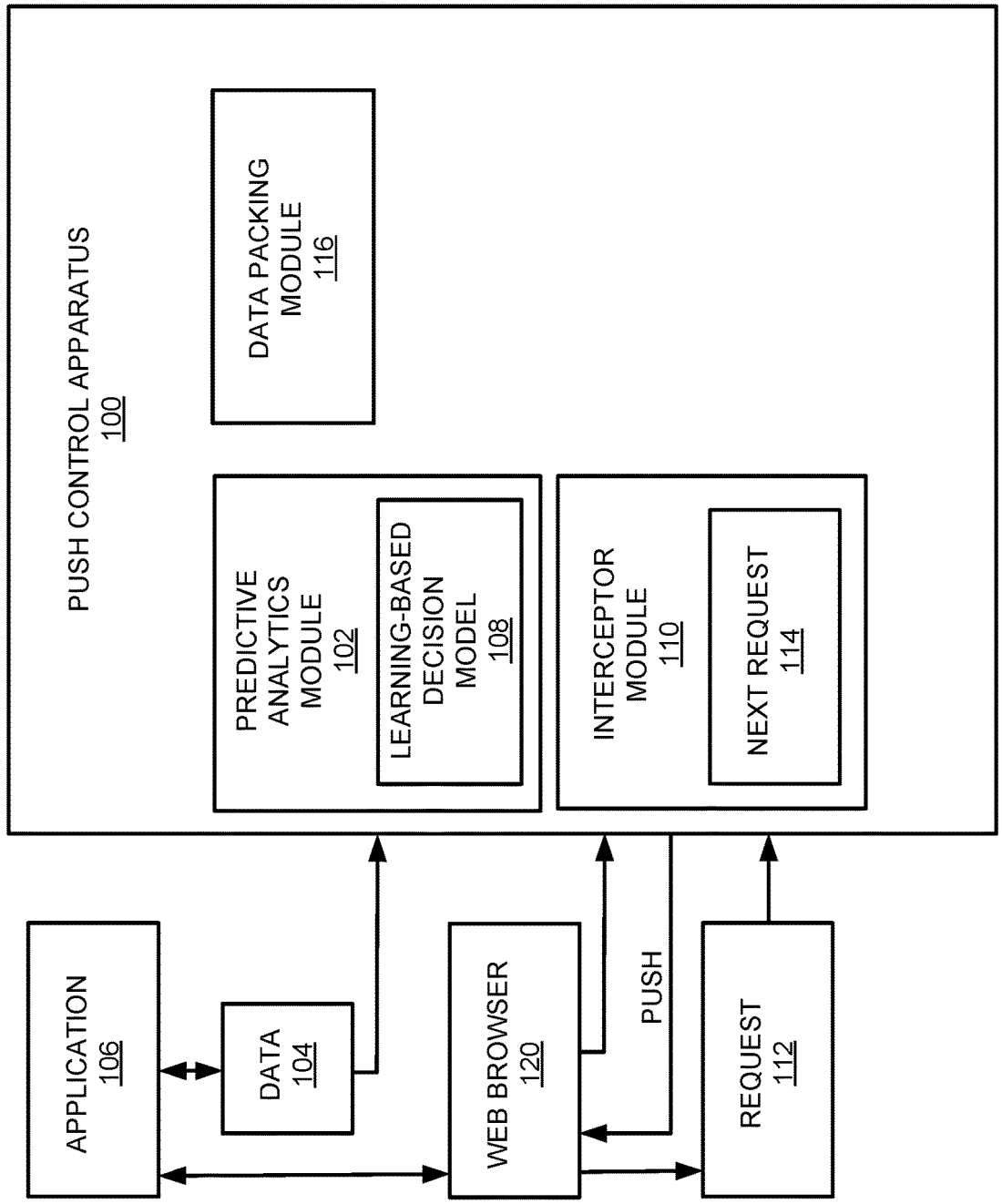
FIG. 1 illustrates an example layout of a push control apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Push control apparatuses, methods for push control, and non-transitory computer readable media having stored thereon machine readable instructions to provide push control are disclosed herein.

In Hypertext Transfer Protocol version 2 (HTTP/2), HTTP/2 Push may allow a web server to send content to a web browser before the web browser requests the content. Thus, the HTTP/2 Push may facilitate the loading of websites. With respect to HTTP/2 Push, pushed content may be used by a web browser (or an application generally) when the web browser may have otherwise produced a request to get the content anyway. However, if the web browser does not use the content, the pushed content may result in wasted bandwidth. Accordingly, it is technically challenging to control when and how an HTTP/2 Push is performed so as to avoid the wastage of bandwidth.

In order to address at least these technical challenges associated with controlling an HTTP/2 Push, the apparatuses, methods, and non-transitory computer readable media disclosed herein implement predictive analytics to control and perform an HTTP/2 Push. In this regard, a server may implement an HTTP/2 Push by utilizing rules that trigger an HTTP/2 Push when certain criteria are met. For example, when the server receives a request to "index.html", the server may also push "styles.css" and "script.js" without waiting for the respective request from the web browser. By the time the web browser finishes parsing "index.html," the transfer of "styles.css" and "script.js" would have already started in "push mode", and the web browser may simply await completion of transfer of these files to utilize the files.

The apparatuses, methods, and non-transitory computer readable media disclosed herein may learn from usage analytics and historical data to predict (e.g., determine) which content is to be pushed over HTTP/2 for end users to access on demand, to thus define the aforementioned rules based on the learning. The learning may be performed, for example, by analysis of data gathered over web application workflows in order to decide which content to push given parameters such as user identification (ID), location, language, etc., associated with the data.

The apparatuses, methods, and non-transitory computer readable media disclosed herein provide for the dynamic selection and setting of a data transmission order based on a packing process, which is a process to allocate (e.g., pack) content within a data stream that includes a specified bandwidth and time duration. In this regard, a data transmission channel may be considered as a two dimensional system that includes the static bandwidth capability on one dimension and time on the second.

Given a client server system, the flow associated with the dynamic selection and setting of the data transmission order may begin with identification of a client's bandwidth, and a determination of whether or not the bandwidth is limited over time (e.g., via flow control). The order of packing data may impact a total waiting time, and throughput of complete ready data frames. By executing an absolute placement process for packing, the apparatuses, methods, and non-transitory computer readable media disclosed herein may achieve, based on a given bandwidth, a specified order for sending data frames from a server to a client in a specified throughput and total time. The apparatuses, methods, and non-transitory computer readable media disclosed herein may implement a reusable solution by saving orders per bandwidth. Thus, the mapping of sending orders for resources (e.g., content) may be pre-prepared, and once a known specific bandwidth is identified, data may be ascertained (e.g., by getting) and sent based on the pre-defined order.

The map of order per bandwidth may be determined based on data change on a production server in a continuous offline mode as an upgrade to a default order. The map of order per bandwidth may be dynamic in that for each personalized client request for content, a server may check by pulling, from a predefined map, whether or not a prioritization has been set for the specific bandwidth. In this regard, if a prioritization has been set for the specific bandwidth, the server may execute the defined order for data pushing. If a prioritization has not been set for the specific bandwidth, the server may enter a default mode and request that an entry is prepared for that specific bandwidth so that it would be ready for a future request of the same bandwidth.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a push control apparatus (hereinafter also referred to as "apparatus 100").

Referring to FIG. 1, the apparatus 100 may include a predictive analytics module 102 to generate, based on analysis of data 104 associated with usage of an application 106, a learning-based decision model 108. The application 106 may include a web application running on a web browser 120. According to an example, the data 104 associated with usage of the application 106 may include a user identification (ID) of a user associated with usage of the application 106, a location of the user associated with usage of the application 106, and/or a language of the application 106.

Regarding the data 104, predictive analytics may benefit from multiple types and forms of relevant data. In this regard, for the data 104 that is captured and reported by the application 106 based on information related to usage of the application 106 and various attributes of the user (e.g., ID, location, etc., as discussed above), examples of usage information may include reported user events (e.g., clicking on buttons), page views joined with registered active user data, data collected from the web browser 120, data collected from the specific geographical location, etc. As the amount of collected data increases, accuracy of the apparatus 100 may similarly increase with respect to prediction of new requests as disclosed herein.

An interceptor module 110 is to ascertain a request 112 for content associated with usage of the application 106, and perform an operation to execute the request 112 for content. The interceptor module 110 is to determine, based on analysis of the learning-based decision model 108, an expected next request 114 associated with the request 112 for content, and additional content associated with the next request 114. While the request 114 may not be made by a user of the application 106, the interceptor module 110 is to infer that such a request 114 would occur. In this regard, the interceptor module 110 is to predict the occurrence of the request 114, and as discussed below, the interceptor module 110 is to perform a push operation before the user of the application 106 has a chance to execute the request 114.

Figure 2:
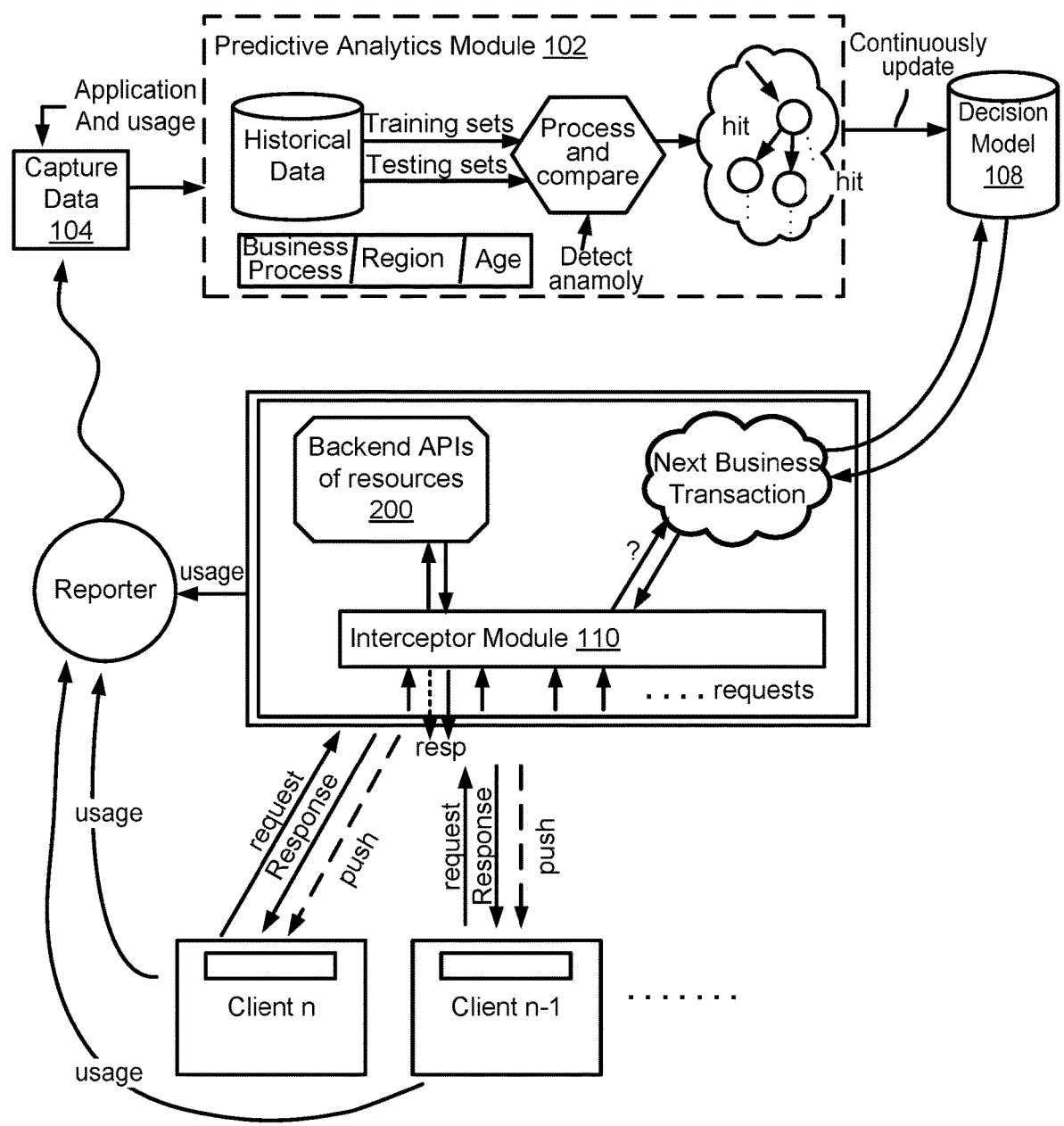
FIG. 2 illustrates further details of the push control apparatus of FIG. 1.

The interceptor module 110 is then to perform a push operation to push the additional content associated with the next request 114 to a source (e.g., a client on which the web browser 120 operates as shown in FIGS. 1 and 2) of the request 112 for content. According to an example, the push operation may include a Hypertext Transfer Protocol version 2 (HTTP/2) Push.

According to an example, the learning-based decision model 108 may be based on a plurality of historical requests. As each new request, such as request 112, is received, the learning-based decision model 108 may be updated. Additionally, the learning-based decision model 108 may include representations of sequences of requests, wherein each sequence is associated with a flow of operations executed by the application 106. In this way, the request 112 may be modeled in the learning-based decision model 108 as a step in a sequence, and the next request 114 may be modeled the learning-based decision model 108 as a subsequent step in the sequence. Therefore, the learning based decision model 108 may be used to predict that, if a request 112 is received, then the request 114 is then also likely or expected to be received.

According to an example, the interceptor module 110 is to determine, based on analysis of a conversion rate between different steps in a sequence in the learning-based decision model 108, the expected next request 114 associated with the request 112 for content, and the additional content associated with the next request 114. The conversion rate, as disclosed herein with respect to FIG. 4, may account for a number of times a step, that represents a request, is used by a user relative to a corresponding previous step. The conversion may, for example, be represented as a percentage, e.g., ninety percent of the time, a request 112 may be followed by a request 114.

According to an example, the learning-based decision model 108 may account for a hit rate of next requests, including the next request 114 associated with the request 112 for content. The hit rate may represent a number of times each of the next requests occurs after the request 112 for content. In this regard, a request that includes a highest hit rate after the request 112 for content may be determined to be more likely as the next request 114 compared to other requests that include a lower hit rate. After pushing the additional information associated with the next request 114 and based on the data packing module 116, more requests may be pushed. Depending on the size and performance of the requests, pushing the next request 114 may end even before the response to the request 112 for content is received by the web browser 120. Therefore, the content associated with the next request 114 will be available at the user end (e.g., client end) waiting for the user to specifically request the additional content associated with the next request 114 in order to activate its content immediately.

According to an example, the interceptor module 110 is to determine, based on analysis of the learning-based decision model 108, an expected time of usage of the additional content, i.e. the time the request 114 is expected. Based on this determination, the interceptor module 110 is to perform the push operation, at the determined time, to push the additional content associated with the next request 114 to the source of the request 112 for content.

According to an example, the interceptor module 110 is to determine, based on analysis of the learning-based decision model 108, a further request (e.g., a different request compared to the next request 114) associated with the next request 114, and further content associated with the further request. For example, a sequence of requests defined in the learning-based decision model 108 may include three requests. Once a request 114 corresponding to the first request of the sequence is received by the interceptor module 110, the interceptor module 110 may predict two additional requests to be received that correspond to the subsequent two requests of the sequence in the learning-based decision model 108. Based on this prediction, a data packing module 116 is to pack a stream to be pushed to the source of the request 112 for content with the additional content associated with the next request 114 and the further content associated with the further request. The interceptor module 110 is to perform the push operation to push the packed stream including the additional content associated with the next request 114 and the further content associated with the further request to the source of the request 112 for content.

According to an example, the data packing module 116 is to pack, based on arrangement of the additional content and the further content by size, the stream to be pushed to the source of the request 112 for content with the additional content associated with the next request 114 and the further content associated with the further request.

According to an example, the data packing module 116 is to determine whether an available time associated with the stream to be pushed to the source of the request 112 for content is greater than a time associated with the additional content associated with the next request 114 and the further content associated with the further request. The available time may represent a total time allocated to the stream to push content to a source (e.g., the web browser 120). The time associated with the additional content associated with the next request 114 and the further content associated with the further request may represent a total time allocated for pushing the next request 114 and the further request. Further, in response to a determination that the available time associated with the stream to be pushed to the source of the request 112 for content is greater than the time associated with the additional content associated with the next request 114 and the further content associated with the further request, the data packing module 116 is to pack the stream to be pushed to the source of the request 112 for content with the additional content associated with the next request 114 and the further content associated with the further request.

According to an example, the data packing module 116 is to determine a bandwidth and available time associated with the stream to be pushed to the source of the request 112 for content. The data packing module 116 is to generate a rectangular area based on the determined bandwidth and available time. Further, the data packing module 116 is to pack, based on arrangement of the additional content and the further content in the rectangular area, the stream to be pushed to the source of the request 112 for content with the additional content associated with the next request 114 and the further content associated with the further request.

FIG. 2 illustrates further details of the apparatus 100.

Referring to FIGS. 1 and 2, the apparatus 100 may be on a server or parts of the apparatus 100 may be on a server, and other parts on a different system. The apparatus 100 may include the application resources and static data, along with application programming interface (APIs) and logic as shown at 200. The predictive analytics module 102 may continuously capture data 104 related to the web application usage. For example, any relevant data may be fed to the predictive analytics module 102 for training and generating the learning-based decision model 108. In this regard, web application clients may report usage data in order to measure success of features. Further, each transaction of any process (user experience (UX) flow) in a web application may be measured. Data fed into the predictive analytics module 102 may be structured or unstructured, and may be ascertained from miscellaneous sources that may be at rest or in motion. In this regard, the aspect of rest may refer to data that is analyzed after the data has been created. The aspect of motion may refer to data that is analyzed in real-time as it is being created.

The predictive analytics module 102 may implement machine learning with respect to the captured data 104, mine and statistically analyze the data 104, and continuously update and produce hit rates per transaction as an output. In this regard, the output of the predictive analytics module 102 may include groups of characteristics, and hit rate for the next predicted transaction. By feeding and training the predictive analytics module 102, hit rates may be maintained, and the hit rate may be increased over time by detecting anomalies and by comparing the training sets with testing sets. Anomalies may represent requests that negatively affect the hit rate for a next request after the request for content. Further, testing sets may represent data sets that are used to test operation of the decision model 108.

The output of the predictive analytics module 102 may include the decision model 108. The decision model 108 may be visualized as sets of data that illustrates different request sequences, or as a linked decisions graph that by traversing over the decision model 108, the next step may be identified by the interceptor module 110 as disclosed herein. The linked decisions graph may represent a tree-like graph of requests (e.g., decisions) and their possible next requests (e.g., consequences).

Figure 3:
FIG. 3 illustrates a data set with respect to the push control apparatus of FIG. 1.

FIG. 3 illustrates a data set with respect to the apparatus 100.

Referring to FIG. 3, the data 104 output example shows that a specific group (e.g., user or set of users) that visits a homepage at 300 is highly likely to request a translation afterwards as shown at 302. This type of data may be used by the predictive analytics module 102 to generate the decision model 108. As disclosed herein, other parameters associated with the data may include user ID, location, language, etc., associated with a user of the application 106. For example, as shown in FIG. 3, the data may include parameters such as the user gender as "female", the location as "Germany", the user age as "29", and a conversion rate of "99%" as disclosed herein with reference to FIG. 4.

Figure 4:
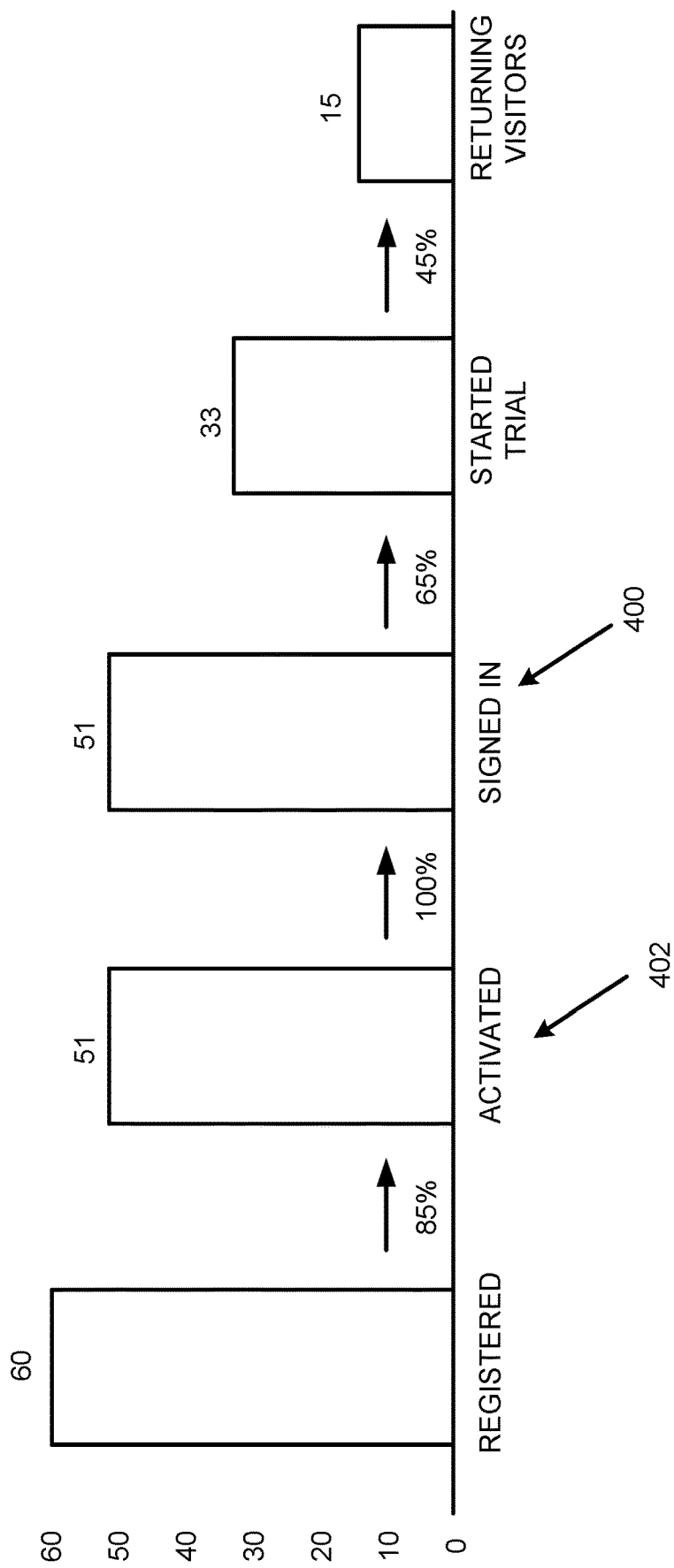
FIG. 4 illustrates funnels with respect to the push control apparatus of FIG. 1.

FIG. 4 illustrates funnels with respect to the apparatus 100.

Referring to FIG. 4, funnels may represent data visualizations that describe a process in the system by breaking the process down into steps and counting the adoption of each step. The data visualization may be implemented, for example, as a bar chart. The conversion rate may be measured from each step of the overall process to the next step.

FIG. 4 may represent funnel data analysis with respect to measurement of adoption for web product trials. The funnel data analysis with respect to FIG. 4 may be based on measurement of reported web application usage. The trial instance lifecycle may be separated into workflow steps, where each workflow step is a pre-condition to the next. In this example, each workflow step may involve the sending of a request by an application 106. In this regard, after measuring and connecting the usage, and joining with the active user data, the conversion rate may be determined from one step to another, for example, by dividing the step usage by the previous step. A potential match in this case may be readily evident (e.g., going to the sign-in page at 400 right after choosing to activate the trial on the activation page at 402, where the conversion rate between these steps is 100%). By identifying each page or step that is a precondition for the next one in the application usage processes, and counting the total unique usage (users) of each step, the conversion rates may be determined by dividing the counting results of each step by its predecessor. For example, 51 users out of 51 users that activated have signed in, hence the conversion rate is 51/51=100%.

Statistical analysis may also be performed by testing funnels of the web application workflows and considering the conversion rate from one step to the next step as a prediction based on historical data analysis. In this regard, for the example of FIG. 4, the 100% rate of users going from activation to sign-in means that the decision model 108 should include an indication that sign-in content should be pushed to users currently at the activation stage, even if the users have yet to sign-in.

Referring again to FIG. 2, the interceptor module 110 may look up, for each incoming web request pattern along with active current user data, a predicted next step from the decision model 108 of the predictive analytics module 102. Further, for each incoming web request, the interceptor module 110 may generate one or more push requests to create a semi continuous browsing experience for the user. Thus, web browsing performance may be continuous, and less request/response oriented.

FIG. 5 illustrates code with respect to the apparatus 100.

Referring to FIG. 5, for the code 500, a push target may include an output of GetNext sample function "PredictiveAnalytics.DecisionsModel.GetNext(r)", which, based on the request, may map the cookie and headers with the active user, and provide prediction based on historical data analysis.

Specifically, at 500, for the "http handle function", in the server side, when the "/home" API is requested, the provided handler function of type 'handler' is executed, thus, the first parameter is the pattern string (address) and the second parameter is of the form "handler func(ResponseWriter, *Request)". The second provided parameter is a function with a response writer and a pointer to the http Request.

At 502, two variables pusher and ok which are outputs of w.(http.Pusher) may be defined to see if the Pusher functionality is available based on 'ok' content. If so, the function is executed, and otherwise, a Push request is not performed.

At 504, optional 'options' for the Push http request that are going to be performed may be defined. Within the push options, a custom 'Header' key value may be defined, and this key value is an "http.Header" that defines the "Accept-Encoding" value of the Push request to be the same as defined on the original request "r" that includes a pointer from 500.

At 506, 'predictedNextBP' may be defined to be the output (string containing a target address) of the learning-based decision model 108 next recommended request (e.g., the next request 114) based on the current request "r" (e.g., the request 112 for content).

At 508, if 'predictedNextBP' (predicted next business process) includes value (GetNext did not return NULL), then processing proceeds to 510.

At 510, the value "err" may be defined to be the output of performing a PUSH request to the 'predictedNextBP' address string (from 506) with some optional custom options (from 504). The value "err" contains an error. If the push is performed properly, "err" will contain NULL, and in case the error is not NULL, the error may be logged at 512.

Figure 6:
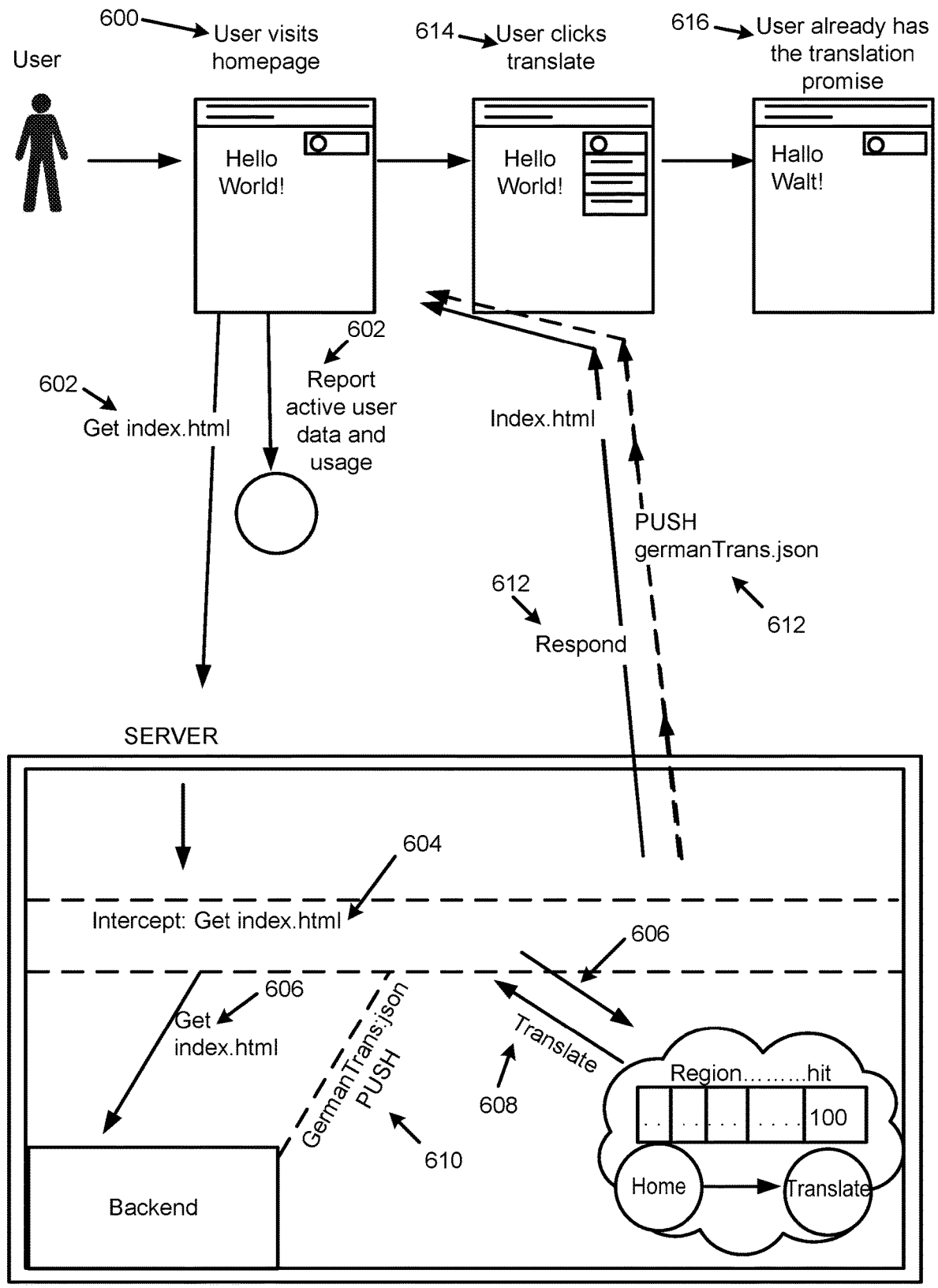
FIG. 6 illustrates an example of operation of the push control apparatus of FIG. 1.

FIG. 6 illustrates an example of operation of the apparatus 100.

Referring to FIG. 6, at 600, a user may visit a homepage by performing a GET REST request.

At 602, a page view may be sent to an arbitrary reporting (e.g., analytics) resource that is also used in parallel to feed the predictive analytics module 102.

At 604, the request may be intercepted by the interceptor module 110 on the web server HTTP requests handler.

At 606, the interceptor module 110 may delegate the request to execution (e.g., request to execute the GET request). Further the interceptor module 110 may sample the decision model 108 for the next request.

At 608, the interceptor module 110, based on the decision model 108, may determine that, since the user belongs to a specific group based on the collected data, the user is expected to click next on translate and choose to get "germanTranslation.json" that includes a dictionary for the site content. As disclosed herein, parameters associated with the data 104 may include user ID, location, language, etc., associated with a user of the application 106. In this regard, a parameter may include a specific group, such as, a German nationality group of users.

At 610, the interceptor module 110 may push (e.g. by performing an HTTP/2 server push) the germanTranslation.json file to the client (e.g. application running on web browser) based on the determination at 608.

At 612, along with pushing the germanTranslation.json file, the interceptor module 110 may also send "push promise streams" to the client. The "push promise streams" may include URLs to additional available resources that the client may be interested in requesting. The client may then request these additional resources using the same push channel.

At 614, the user may click on translate, and choose to translate the website to German.

At 616, the requested content, i.e., the translated words on the website, may be displayed. Thereafter, the decision model 108 may be updated with the confirmed user decision to translate, such that it may stay one step or more ahead of the user's actions. The method may then return to 600 and repeat.

Turning back to FIG. 1, the data packing module 116 may configure the expected mean time between requests. For example, a rule may specify that when users navigate from the application homepage to some offered sub-page, an advertisement should appear for five seconds.

The data packing module 116 is to sample connected web-client internet speed, for example, by determining the download time of a small testing request that is predefined. For example, if the time measured on the client application from the beginning of the download to the end is 1 second and the media size is 1 KB, then the connected web-client internet speed is determined to be 1 KB/sec. This result may be multiplied with a time range to determine how much bandwidth is available to execute other requests.

The data packing module 116 is to pack content (based on prediction requests) in an ordered fashion based on available time and bandwidth. In this regard, as disclosed herein with reference to FIG. 7, the packing of requests may represent packing of content associated with predicted requests. For example, when choosing to pack data into a stream, the data packing module 116 may arrange content to be pushed in ascending order of size, so that a maximum number of predicted requests that would be handled relatively quickly may be packed in a stream. This also allows higher throughput at short windows of time available for execution of requests. For example, if the next set of push-able requests are (name:size): [rocky.jpg: 2 MB, dog.html: 200 KB, mamba.svg: 300 KB] then the output would indicate the following order: [dog.html, mamba.svg, rocky.jpg]. Further, the data packing module 116 may consider the time available in order to decide whether or not to push content of various sizes. For example, if a client's internet speed is 1 MB/sec, the time interval available to use is 2 seconds, and given the potential next requests to include [rocky.jpg: 2 MB, dog.html: 200 KB, mamba.svg: 300 KB], then [rocky.jpg] will be chosen as the candidate to be pushed.

The data packing module 116 may also consider finding all enclosing rectangles of minimum area that may be placed, without any overlap, in a stream defined by a large rectangle of a specified bandwidth and time. As disclosed herein, each rectangle (e.g., enclosing rectangle) may represent an allocation (e.g., division) of overall content for different predicted requests that is to be pushed, where one dimension (e.g., an x-axis dimension) of the rectangle may represent time, and another perpendicular dimension (e.g., a y-axis dimension) of the rectangle may represent bandwidth. The data packing module 116 may select the x-coordinates (e.g., time) of all the rectangles before any of the y-coordinates. That is, the rectangles may be placed in a stream defined by the large rectangle by first accounting for the time needed for content, and then accounting for the bandwidth needed for the content.

The data packing module 116 may transform the problem of packing content into a stream into a perfect-packing problem with no empty spaces by adding additional rectangles. To determine the y-coordinates, the data packing module 116 may determine which other rectangles (e.g., content) may be efficiently placed in each empty position such that they join together to maximize time and bandwidth utilization. For example, if for a single client user the container rectangle is 3 seconds wide (x-axis in seconds, and the available time is 3 seconds) and its height is 3 MB (internet speed is 3 MB/sec), then the window may include 9 MB in total in different coordinates based on the content that may be pushed.

According to an example, the data packing module 116 may implement an oriented equal-perimeter rectangle data packing process, which is based on a set of rectangles of sizes $1 \times N$, $2 \times (N-1)$, $(N-1) \times 2$, $N \times 1$, and where the rectangles may not be rotated to fit in a larger overall rectangular area. In this regard, given N, all rectangles are unique and include a perimeter of $2N+2$.

According to another example, the data packing module 116 may implement an un-oriented double-perimeter rectangle data packing process, which is based on a set of rectangles of sizes $1 \times (2N-1)$, $2 \times (2N-2)$, ..., $(N-1) \times (N+1)$, $N \times N$, and rectangles may be rotated by 90-degrees to fit in a larger overall rectangular area. In this regard, all rectangles may be unique and include a perimeter of $4N$.

Figure 7:
FIG. 7 illustrates packing content (based on predicted requests) in an ordered fashion with respect to the push control apparatus of FIG. 1.

FIG. 7 illustrates packing content (based on predicted requests) in an ordered fashion with respect to the apparatus 100.

Referring to FIG. 7, the rectangles at 700 may represent web requests over time chosen from the set of possible web requests range, and tied with the current step in the overall workflow. The current step in the workflow may represent the next request 114 after the request 112 for content. Further, the container frame may represent the client available bandwidth over time (x=time, y=bandwidth, in the orientation of FIG. 7).

The interceptor module 110 is to push the content (e.g., multiple predicted requests) in the advised order determined by the data packing module 116. In this regard, sessions may be packed in order to discover and highlight time gaps between sets of sessions. The sessions may represent browsing sessions made by unique users, and analyze workflow made by each user in the presence of multiple users. Sessions may be used to identify requests when a user that made a request is not registered, because the predictive analytics module 102 may use a session identifier to group a set of requests. Further, sessions may be used to provide personalized predictions, where user behavior may be identified by a set of actions that a user performs while navigating through the application 106.

The data packing module 116 may also generate a visualization of the discovered gaps and how these gaps can be filled with other requests to increase performance. For example, relevant content may be pushed into these gaps to increase performance.

With respect to output visualization, examples of parameters that may be output include mean content processing and download (active time to first byte), mean gap (requests are not being processed over the connection, and thus idle), transactions consumption distribution over time (e.g., based on average users actions reporting timestamps).

Figure 8:
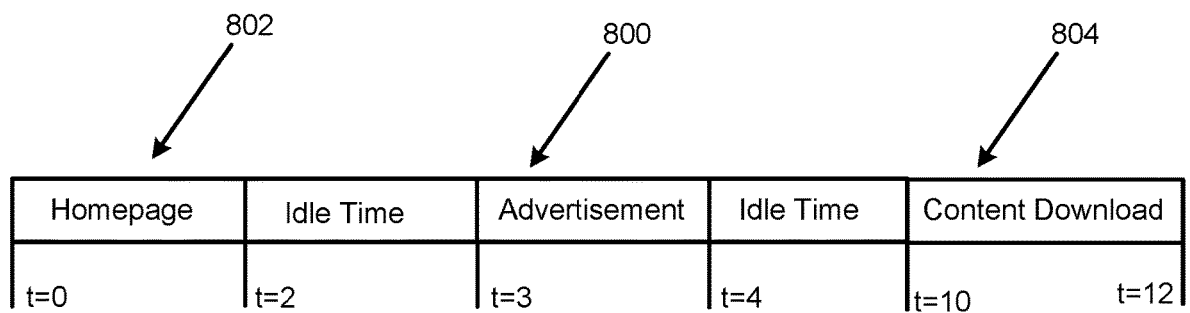
FIG. 8 illustrates transaction consumption distribution over time with respect to the push control apparatus of FIG. 1.

FIG. 8 illustrates transaction consumption distribution over time with respect to the apparatus 100.

Referring to FIG. 8, the visualization shows that the advertisement at 800 could have been loaded during the idle time within the homepage step at 802, and the content download at 804 could have been prepared (e.g., pushed) during the idle time within the advertisement redirection step at 800. The visualization describes areas that are not utilized by the web application in which the user is not fully utilizing the available bandwidth. The visualization provides an indication as to how this idle time may have been filled with requests that are going to be requested later at no additional cost (since bandwidth is available), hence resulting in time savings for a user.

The data packing module 116 may update a packing orders table for reusable outcomes in order to avoid duplicate heavy calculations. That is, the packing orders table may represent a table that includes a listing of how previous sets of content have been packed so that future occurrences of such sets of content may be packed in the same manner as specified by the packing orders table. In this regard, the data packing module 116 may rely on the captured sessions (from production) or test configured sessions data. The data packing module 116 may generate, for each session, a sequence of events as monitored and collected by an application monitoring solution. In addition, within the proactive approach of packing the requests, the calculation (regardless to the technique chosen) may be relatively extensive, and hence such re-calculations may be avoided and then reused as needed.

Figure 9:
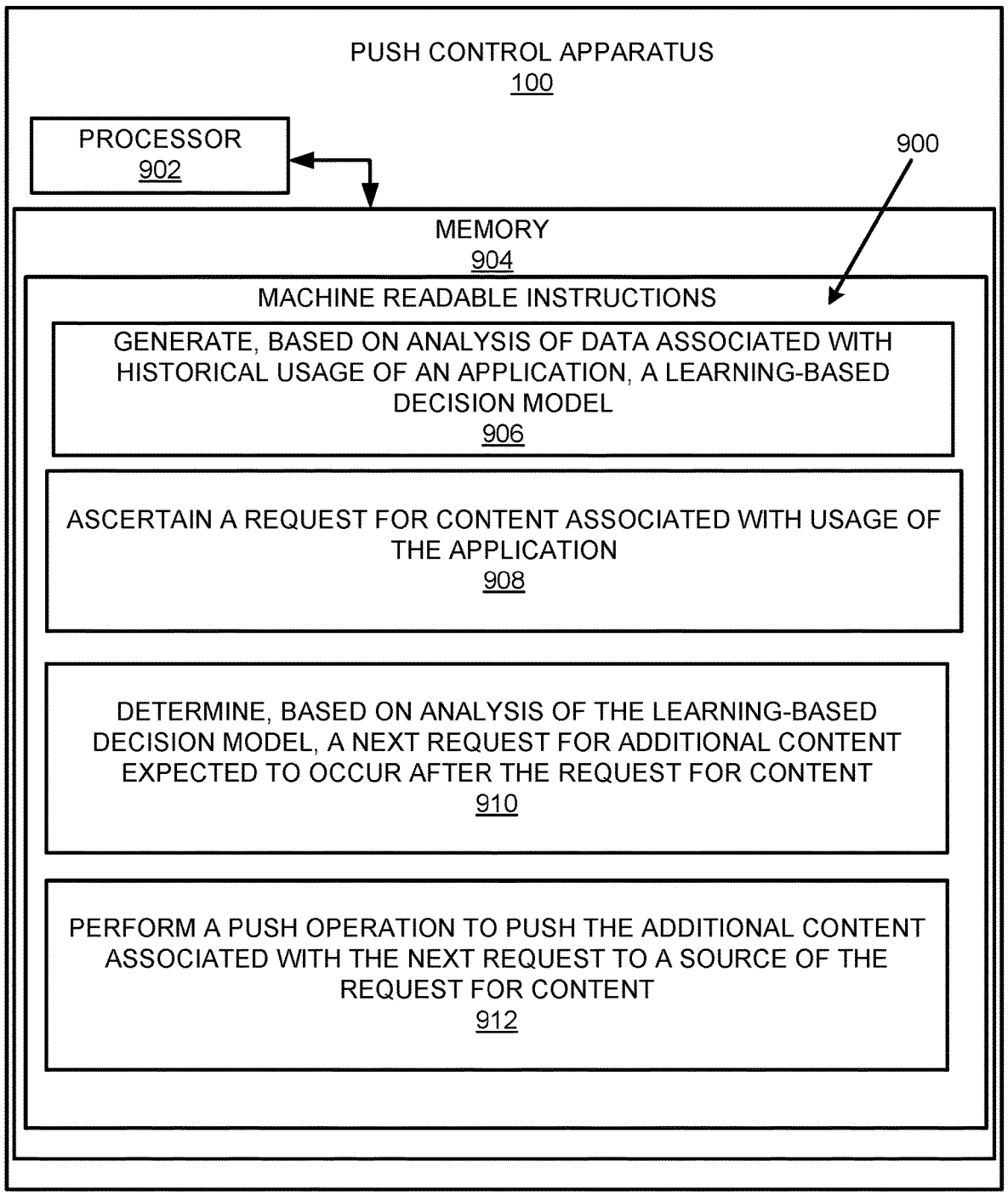
FIG. 9 illustrates an example block diagram for push control.
Figure 11:
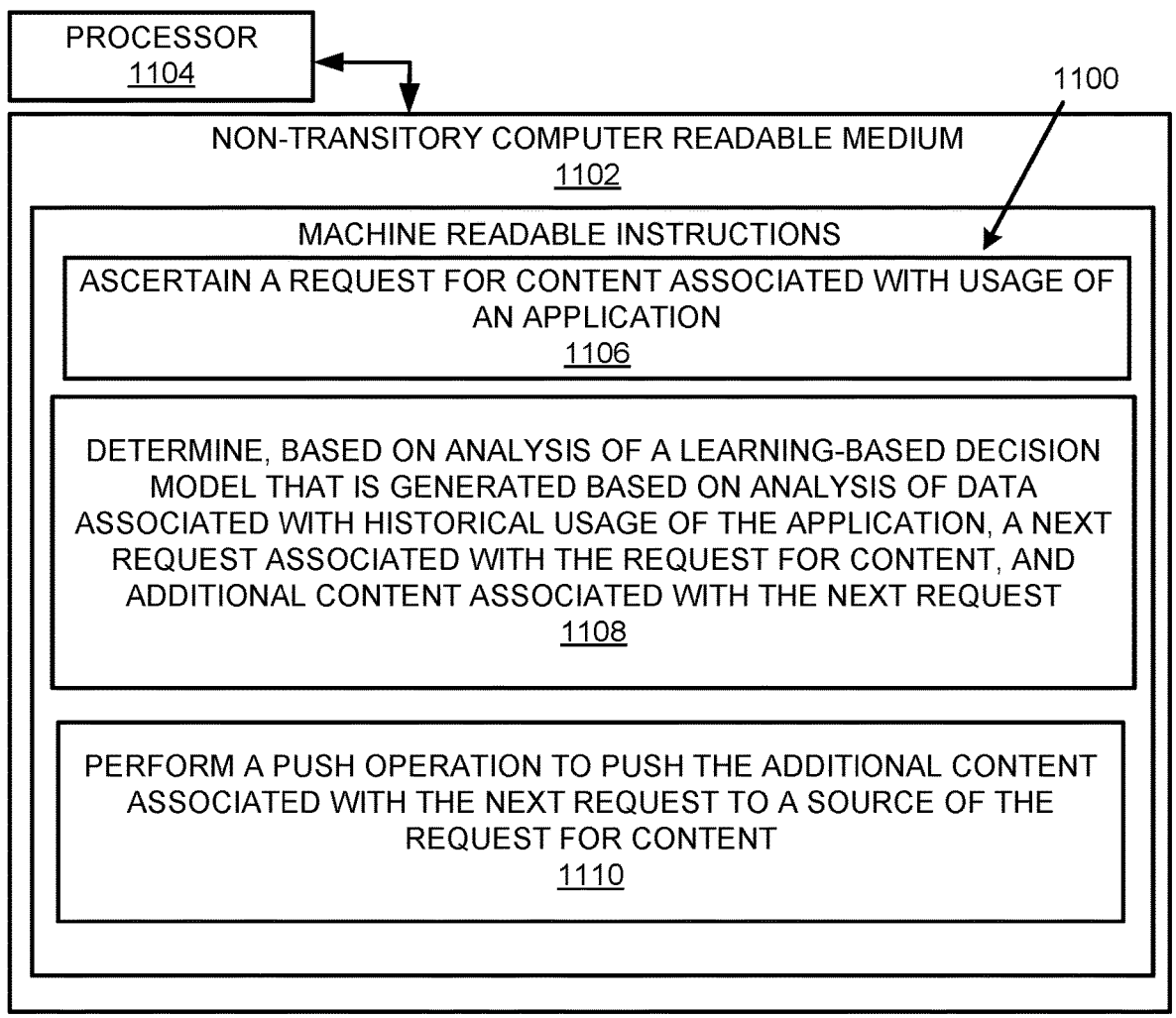
FIG. 11 illustrates a further example block diagram for push control.

FIGS. 9-11 respectively illustrate an example block diagram 900, an example flowchart of a method 1000, and a further example block diagram 1100 for push control. The block diagram 900, the method 1000, and the block diagram 1100 may be implemented on the apparatus 100 described above with reference to FIG. 1 by way of example and not limitation. The block diagram 900, the method 1000, and the block diagram 1100 may be practiced in other apparatuses. In addition to showing the block diagram 900, FIG. 9 shows hardware of the apparatus 100 that may execute the instructions of the block diagram 900. The hardware may include a processor 902, and a memory 904 (i.e., a non-transitory computer readable medium) storing machine readable instructions that when executed by the processor cause the processor to perform the instructions of the block diagram 900. The memory 904 may represent a non-transitory computer readable medium. FIG. 10 may represent a method for push control, and the steps of the method. FIG. 11 may represent a non-transitory computer readable medium 1102 having stored thereon machine readable instructions to provide push control. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, the memory 904 may include instructions 906 to generate, based on analysis of data 104 associated with historical usage of an application 106, a learning-based decision model 108.

The processor 902 may fetch, decode, and execute the instructions 908 to ascertain a request 112 for content associated with usage of the application 106.

The processor 902 may fetch, decode, and execute the instructions 910 to determine, based on analysis of the learning-based decision model 108, a next request 114 for additional content expected to occur after the request 112 for content.

The processor 902 may fetch, decode, and execute the instructions 912 to perform a push operation to push the additional content associated with the next request 114 to a source of the request 112 for content.

Referring to FIGS. 1-8 and 10, and particularly FIG. 10, for the method 1000, at block 1002, the method may include ascertaining a request 112 for content associated with usage of an application 106.

At block 1004 the method may include determining, based on analysis of a learning-based decision model 108 that is generated based on analysis of data associated with historical usage of the application, a next request 114 for additional content expected to occur after the request 112 for content, and a further request for further content expected to occur after the next request 114.

At block 1006 the method may include packing a stream to be pushed to a source of the request 112 for content with the additional content associated with the next request 114 and the further content associated with the further request.

At block 1008 the method may include performing a push operation to push the packed stream including the additional content associated with the next request 114 and the further content associated with the further request to the source.

Referring to FIGS. 1-9 and 11, and particularly FIG. 11, for the block diagram 1100, the non-transitory computer readable medium 1102 may include instructions 1106 to ascertain a request 112 for content associated with usage of an application 106.

The processor 1104 may fetch, decode, and execute the instructions 1108 to determine, based on analysis of a learning-based decision model 108 that is generated based on analysis of data associated with historical usage of the application 106, a next request 114 for additional content expected to occur after the request 112 for content.

The processor 1104 may fetch, decode, and execute the instructions 1110 to perform a push operation to push the additional content associated with the next request 114 to a source of the request 112 for content.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
 a processor; and
 a non-transitory computer readable medium storing machine readable instructions that when executed by the processor cause the processor to:
  generate, based on analysis of data associated with historical usage of an application, a learning-based decision model, wherein the data includes at least one of a geographical location of a user associated with usage of the application, or a language of the user associated with the usage of the application;
  ascertain a request for content associated with usage of the application;
  determine, based on analysis of the learning-based decision model,
   a next request for additional content expected to occur after the request for content, wherein the learning-based decision model accounts for a hit rate of a plurality of next requests, including the next request, wherein the hit rate represents a number of times each of the plurality of next requests occurs after the request for content, and wherein the hit rate is adjusted based on anomalies associated with the plurality of next requests; and
  perform a push operation to push the additional content associated with the next request to a source of the request for content by
   determining a bandwidth and available time associated with a stream to be pushed to the source of the request for content, and
   packing, to maximize the bandwidth and available time utilization, the stream to be pushed to the source of the request for content.

2. The apparatus according to claim 1, wherein the push operation includes a Hypertext Transfer Protocol version 2 (HTTP/2) Push.

3. The apparatus according to claim 1, wherein the hit rate is increased based on anomalies that represent requests that negatively affect the hit rate for the next request after the request for content.

4. The apparatus according to claim 1, wherein the instructions to determine the next request comprise instructions to:
 determine, based on analysis of a conversion rate between different steps representing requests in the learning-based decision model, the next request for additional content expected to occur after the request for content, wherein the conversion rate accounts for a number of unique users for each step of the different steps.

5. The apparatus according to claim 1, wherein the learning-based decision model includes a plurality of steps that represent requests, and wherein the request for content represents an initial step of the plurality of steps in the learning-based decision model, and the next request represents a step subsequent to the initial step.

6. The apparatus according to claim 1, wherein the instructions are further to cause the processor to:
   determine, based on the analysis of the learning-based decision model, a further request for further content expected to occur after the next request;
   pack the stream to be pushed to the source of the request for content with the additional content associated with the next request and the further content associated with the further request, and
   wherein the instructions to perform the push operation comprise instructions to perform the push operation to push the packed stream including the additional content associated with the next request and the further content associated with the further request to the source of the request for content.

7. The apparatus according to claim 6, wherein the instructions to pack the stream to be pushed to the source of the request for content with the additional content associated with the next request and the further content associated with the further request are further to cause the processor to:
   pack, based on sizes of the additional content and the further content, the stream to be pushed to the source of the request for content with the additional content associated with the next request and the further content associated with the further request.

8. The apparatus according to claim 6, wherein the instructions to pack the stream to be pushed to the source of the request for content with the additional content associated with the next request and the further content associated with the further request are further to cause the processor to:
   determine whether the available time associated with the stream to be pushed to the source of the request for content is greater than a time value associated with the additional content associated with the next request and the further content associated with the further request, wherein the available time represents a total time allocated to the stream to push content to the source; and
   in response to a determination that the available time associated with the stream to be pushed to the source of the request for content is greater than the time value associated with the additional content associated with the next request and the further content associated with the further request, pack the stream to be pushed to the source of the request for content with the additional content associated with the next request and the further content associated with the further request.

9. The apparatus according to claim 6, wherein the instructions to pack the stream to be pushed to the source of the request for content with the additional content associated with the next request and the further content associated with the further request are further to cause the processor to:
   determine the bandwidth and available time associated with the stream to be pushed to the source of the request for content;
   generate a rectangular area based on the determined bandwidth and available time; and
   pack, based on arrangement of the additional content and the further content in the rectangular area, the stream to be pushed to the source of the request for content with the additional content associated with the next request and the further content associated with the further request.

10. The apparatus according to claim 9, wherein the instructions to pack, based on the arrangement of the additional content and the further content in the rectangular area, the stream to be pushed to the source of the request for content with the additional content associated with the next request and the further content associated with the further request are further to cause the processor to:
    pack, based on arrangement of the additional content and the further content that minimizes empty spaces in the rectangular area and eliminates overlap of content in the rectangular area, the stream to be pushed to the source of the request for content with the additional content associated with the next request and the further content associated with the further request.

11. The apparatus according to claim 1, wherein the instructions to determine the next request comprise instructions to:
    determine, based on analysis of a conversion rate between different steps representing requests in the learning-based decision model, the next request for additional content expected to occur after the request for content, wherein the conversion rate accounts for a percentage of time a step occurs in association with a previous step.

* * * * *